United States Patent
Song et al.

(10) Patent No.: US 12,547,327 B2
(45) Date of Patent: Feb. 10, 2026

(54) PROGRAM SPEED COMPENSATION FOR NON-VOLATILE MEMORY CELLS

(71) Applicant: Silicon Storage Technology, Inc., San Jose, CA (US)

(72) Inventors: Yi Song, San Jose, CA (US); Xian Liu, Sunnyvale, CA (US); Jinho Kim, Saratoga, CA (US)

(73) Assignee: Silicon Storage Technology, Inc., San Jose, CA (US)

( * ) Notice: Subject to any disclaimer, the term of this patent is extended or adjusted under 35 U.S.C. 154(b) by 134 days.

(21) Appl. No.: 18/586,350

(22) Filed: Feb. 23, 2024

(65) Prior Publication Data
US 2025/0181255 A1   Jun. 5, 2025

Related U.S. Application Data

(60) Provisional application No. 63/606,008, filed on Dec. 4, 2023.

(51) Int. Cl.
*G06F 3/00*   (2006.01)
*G06F 3/06*   (2006.01)

(52) U.S. Cl.
CPC .......... *G06F 3/0625* (2013.01); *G06F 3/0659* (2013.01); *G06F 3/0673* (2013.01)

(58) Field of Classification Search
CPC .. G06F 3/04817; G06F 3/0482; G06F 3/0486; G06F 3/0488; G06F 3/04883; G06F 3/04886; G06F 3/0604; G06F 3/0652; G06F 3/0679; G06F 3/0412; G06F 3/0416; G11C 16/0433; G11C 11/5628; G11C 16/0425;
(Continued)

(56) References Cited

U.S. PATENT DOCUMENTS 5,029,130 A    7/1991  Yeh
6,747,310 B2   6/2004  Fan et al.
(Continued)

FOREIGN PATENT DOCUMENTS

TW    202127458 A    7/2021
WO    2008 157106    12/2008
WO    2016 209563    12/2016

OTHER PUBLICATIONS

PCT Search Report and Written Opinion mailed on Jul. 25, 2024 corresponding to the related PCT Patent Application No. US2024/019272.

(Continued)

*Primary Examiner* — Thong Q Le
(74) *Attorney, Agent, or Firm* — DLA Piper LLP (US)

(57) ABSTRACT

A method of programming memory cells that includes reading the memory cells to determine respective read currents for the memory cells. Respective ones of the memory cells are assigned to one of a plurality of groups of the memory cells, wherein respective ones of the plurality of groups of the memory cells are associated with a different range of read currents, such that the determined read current for a respective one of the memory cells is within the range of read currents for the group of the memory cells to which the memory cell is assigned. The memory cells are programmed using program currents that vary for respective ones of the memory cells depending upon the group of the memory cells to which the memory cell is assigned.

22 Claims, 14 Drawing Sheets

---

Block 1: (Optional) Erase selected memory cells.

↓

Block 2: (Optional) Pre-program selected memory cells using one or more program pulses.

↓

Block 3: Read the selected memory cells to determine respective read currents Ir.

↓

Block 4: Assign the selected memory cells to one of a plurality of groups based upon the determined respective read currents Ir. For example:
- Assign memory cells with a read current Ir less than a first reference read current Iref1 to a first group.
- Assign memory cells with a read current Ir greater than or equal to the first reference read current Iref1 but less than a second reference read current Iref2 (where Iref2>Iref1) to a second group.
- Assign memory cells with a read current Ir greater than or equal to the second reference read current Iref2 to a third group.

↓

Block 5: Program memory cells to a target program state using different program currents based upon memory group assignment:
- Nominal program current for memory cells assigned to the second group.
- Higher than nominal program current for memory cells assigned to the third group.
- Lower than nominal program current for memory cells assigned to the first group.

(58) Field of Classification Search
CPC . G11C 16/10; G11C 16/0483; G11C 2216/04; G11C 16/14; G11C 16/26; G11C 16/3454; G11C 16/3459
See application file for complete search history.

(56) References Cited

U.S. PATENT DOCUMENTS

| | | |
|---|---|---|
| 6,855,980 B2 | 2/2005 | Wang et al. |
| 6,992,929 B2 | 1/2006 | Chen |
| 7,002,843 B2 | 2/2006 | Guterman |
| 7,315,056 B2 | 1/2008 | Klinger |
| 7,868,375 B2 | 1/2011 | Liu et al. |
| 8,711,636 B2 | 4/2014 | Do et al. |
| 9,245,638 B2 | 1/2016 | Do |
| 10,838,652 B2 | 11/2020 | Markov |
| 2005/0083735 A1 | 4/2005 | Chen |
| 2012/0113714 A1 | 5/2012 | Choy |
| 2022/0392549 A1* | 12/2022 | Markov ............ G11C 16/0425 |

OTHER PUBLICATIONS

Taiwanese Office Action mailed on Aug. 19, 2025 corresponding to the related Taiwanese Patent Application No. 113142211.

* cited by examiner

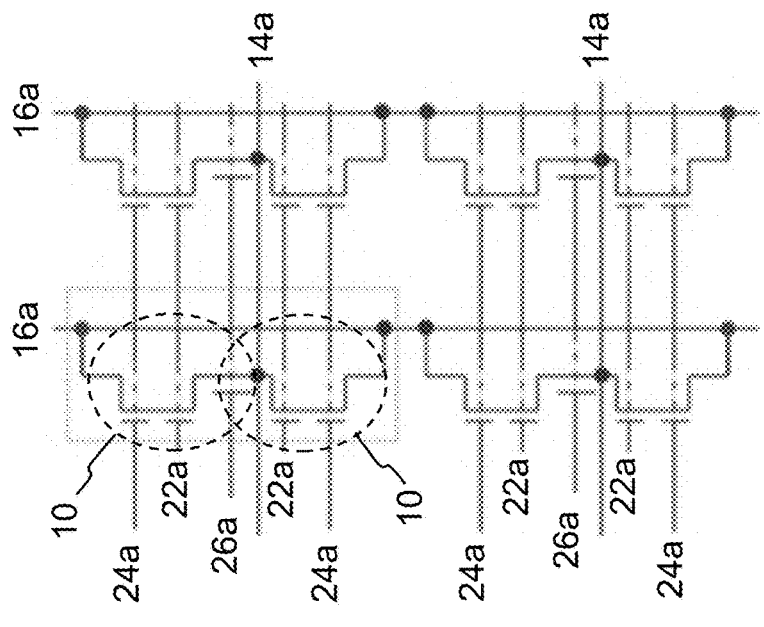
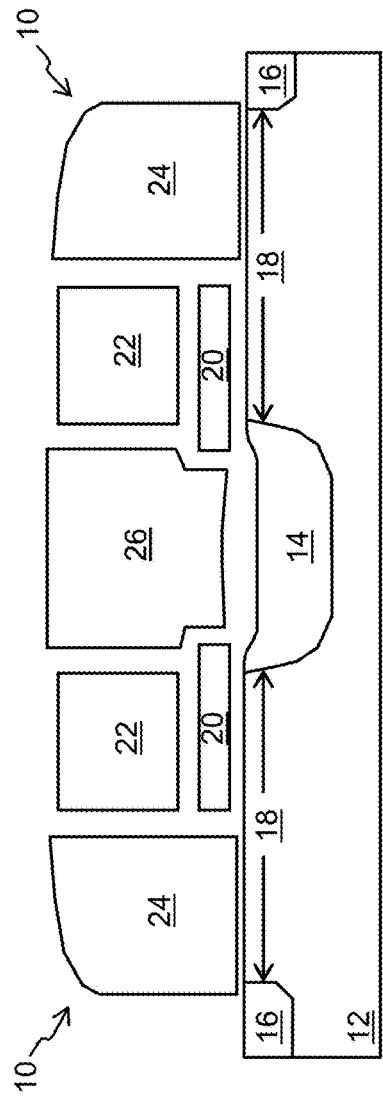
FIG. 1
(Prior Art)
FIG. 2
(Prior Art)

PROGRAM SPEED COMPENSATION FOR NON-VOLATILE MEMORY CELLS

RELATED APPLICATIONS

This application claims the benefit of U.S. Provisional Application No. 63/606,008, filed Dec. 4, 2023, and which is incorporated herein by reference.

FIELD OF THE INVENTION

The present invention relates to non-volatile memory cells, and more particularly to a technique of programming memory cells.

BACKGROUND OF THE INVENTION

Split-gate non-volatile memory devices are well known in the art. See for example U.S. Pat. No. 7,868,375, which discloses a four-gate memory cell configuration, and which is incorporated herein by reference for all purposes. Specifically, FIG. 1 of the present disclosure illustrates a pair of split gate memory cells 10 each with spaced apart source and drain regions 14/16 formed in a silicon semiconductor substrate 12. The source region 14 can be referred to as a source line SL (because it commonly is connected to other source regions for other memory cells in the same row or column), and the drain region 16 is commonly connected to a bit line. A channel region 18 of the substrate 12 extends between the source/drain regions 14/16. A floating gate 20 is disposed over (i.e., vertically over and laterally overlapping) and insulated from (and directly controls the conductivity of) a first portion of the channel region 18 (and partially over and insulated from the source region 14). A control gate 22 is disposed over and insulated from the floating gate 20. A select gate 24 (also referred to as a word line gate) is disposed over and insulated from (and directly controls the conductivity of) a second portion of the channel region 18. An erase gate 26 is disposed over and insulated from the source region 14 and is laterally adjacent to the floating gate 20. The erase gate 26 can include a notch that faces an edge of the floating gate 20.

A plurality of such memory cells 10 can be arranged in rows and columns to form a memory cell array, as illustrated in FIG. 2. While FIG. 1 only shows a pair of memory cells (sharing a common source region 14 and erase gate 26), the memory cell pairs can be placed end to end to form a column of memory cells (where the memory cell pairs can share a common drain region). While only two such columns are shown in FIG. 2, there can be many such columns. Each column can include a bit line 16a electrically connecting together all the drain regions 16 in the column. Each row of memory cells can include a control gate line 22a electrically connecting together all the control gates 22 in the row of memory cells. For example, all the control gates 22 in each row of memory cells can be formed as a continuous line of conductive material, where a portion of the continuous line passing through any given memory cell serves as its control gate 22. Each row of memory cells can include a select gate line 24a electrically connecting together all the select gates 24 in the row of memory cells. For example, all the select gates 24 in each row of memory cells can be formed as a continuous line of conductive material, where a portion of the continuous line passing through any given memory cell serves as its select gate 24. Each row of memory cell pairs can include an erase gate line 26a electrically connecting together all the erase gates 26 in the row of memory cell pairs. For example, all the erase gates 26 in each row of memory cell pairs can be formed as a continuous line of conductive material, where a portion of the continuous line passing through any given memory cell pair serves as its erase gate 26. Finally, each row of memory cell pairs can include a source line 14a electrically connecting together all the source regions 14 in the row of memory cell pairs. For example, all the source regions 14 in each row of memory cell pairs can be formed as a continuous line of conductive diffusion in the substrate 12, where a portion of the continuous line passing through any given memory cell pair serves as its source region 14.

Various combinations of voltages are applied to the control gate 22, select gate 24, erase gate 26 and source and drain regions 14/16, to program the split gate memory cell 10 (i.e., inject electrons onto the floating gate 20), to erase the split gate memory cell 10 (i.e., remove electrons from the floating gate 20), and to read the split gate memory cell 10 (i.e., measure or detect the conductivity of the channel region 18, by for example measuring or detecting a read current through the channel region 18, to determine the programming state of the floating gate 20).

Split gate memory cell 10 can be operated in a digital manner, where the split gate memory cell 10 is set to one of only two possible states: a programmed state and an erased state. The split gate memory cell 10 is erased by placing a high positive voltage on the erase gate 26, and optionally a negative voltage on the control gate 22, to induce tunneling of electrons from the floating gate 20 to the erase gate 26 (leaving the floating gate 20 in a more positively charged state—the erased state). Split gate memory cell 10 can be programmed by placing positive voltages on the control gate 22, erase gate 26, select gate 24 and source region 14, and a current on drain region 16. Electrons will then flow along the channel region 18 from the drain region 16 toward the source region 14, with electrons becoming accelerated and heated whereby some of them are injected onto the floating gate 20 by hot-electron injection (leaving the floating gate 20 in a more negatively charged state—the programmed state).

One technique to program the memory cells is sequential programming, which involves applying the programming voltages as a series of pulses, with each pulse of programming voltages injecting more electrons onto the floating gate thus increasing the program state of the memory cell with each pulse, until the desired programming state is achieved. With sequential programming, there can be intervening read operations between the programming pulses to determine if the desired programming state has been achieved by the last applied programming pulse (in which case programming ceases) or has not been achieved (in which case programming continues with one or more programming pulses). For example, each desired program state can be associated with a target read current Irtarget (i.e., the desired and therefore target current through the channel region 18 during a read operation that is associated with the desired program state). The higher the program state (i.e., the more electrons on the floating gate), the lower the read current Ir. Therefore, read current Ir will drop after each programming pulse. Once a target read current Irtarget is reached (reflecting the desired program state), programming for that memory cell ceases.

If the same set of program voltages are applied during each pulse in sequential programming, the programming amount drops pulse to pulse, because as the floating gate becomes more negatively charged with each pulse, fewer electrons are injected onto the floating gate if the parameters of the programming pulses (applied voltages, supplied current, duration) remain constant. Therefore, each time a memory cell is determined to have not reached its desired programming state after any given pulse, one or more of the programming parameters can be stepped up to a higher value in the next pulse, to compensate for the dropping pulse-to-pulse programming amount that would otherwise occur. For example, for the memory cell of FIG. 1, programming parameters that can be stepped up from one programming pulse to the next programming pulse can include increases in one or more of the following: voltage applied to the control gate, voltage applied to the erase gate, voltage applied to the source region, current supplied to the drain region, and duration of the programming pulse.

Split gate memory cell 10 can be read by placing positive voltages on the select gate 24 (turning on the portion of channel region 18 under the select gate 24 by making it conductive) and drain region 16 (and optionally on the erase gate 26 and the control gate 22), and sensing current flow through the channel region 18. If the floating gate 20 is positively charged (i.e. split gate memory cell 10 is erased), the split gate memory cell 10 will turn on because the both portions of the channel region 18 are conductive due to the lack of electrons on the floating gate 20, and electrical current will flow from drain region 16 to source region 14 (i.e. the split gate memory cell 10 is sensed to be in its erased "1" state based on sensed current flow). If the floating gate 20 is negatively charged (i.e. split gate memory cell 10 is programmed), the portion of channel region 18 under the floating gate is turned off (low conductivity), thereby preventing appreciable current flow (i.e., the split gate memory cell 10 is sensed to be in its programmed "0" state based on no, or minimal, current flow). Memory cells 10 are considered non-volatile because they maintain their program state even when power is not applied to the semiconductor device. Memory cells 10 can be referred to as split gate memory cells because two different gates (floating gate 20 and select gate 24), respectively, directly control the conductivity of two different portions of the channel region 18.

Split gate memory cell 10 can alternately be operated in an analog manner where the memory state (i.e. the amount of charge, such as the number of electrons, on the floating gate 20) of the split gate memory cell 10 can be incrementally changed anywhere from a fully erased state (minimum number of electrons on the floating gate 20) to a fully programmed state (maximum number of electrons on the floating gate 20), or just a portion of this range. This means the split gate memory cell 10 storage is analog, which allows for very precise and individual tuning of each split gate memory cell 10 in an array of split gate memory cells 10. Alternatively, the split gate memory cell 10 could be operated as an MLC (multilevel cell) where it is configured to be programmed to one of many discrete values (such as 16 or 64 different values).

Split gate memory cells with fewer gates are also known. For example, FIG. 3 illustrates known split gate memory cells 10 that are the same as that of FIG. 1, except the control gates 22 are omitted. See for example U.S. Pat. No. 7,315,056. Voltage coupling to the floating gate 20 provided by the control gate 22 of the split gate memory cell of FIG. 1 is provided instead by the erase gate 26 and source region 14 of the split gate memory cell in FIG. 3. FIG. 4 illustrates an example layout of an array of the split gate memory cells 10 of FIG. 3.

As another example, FIG. 5 illustrates known split gate memory cells 10 that are similar to that of FIG. 1, except the control gates 22 and the erase gates 26 are omitted. See for example U.S. Pat. No. 5,029,130. The erase voltage for the split gate memory cell of FIG. 5 is applied to the select gate 24, which has a first portion laterally adjacent the floating gate 20, and a second portion that extends up and over the floating gate 20. FIG. 6 illustrates an example layout of an array of the split gate memory cells 10 of FIG. 5.

As yet another example, FIG. 7 illustrates known split gate memory cells 10 that are similar to that of FIG. 5, except a conductive block of material 28 is formed in contact with source region 14, to serve as an extended source line. See for example U.S. Pat. No. 6,855,980. An example layout for an array of the split gate memory cells 10 of FIG. 7 can be the same as that in FIG. 6.

While any of the split gate memory cells 10 of FIGS. 1, 3, 5 and 7 can be operated in a digital manner, analog manner, or as an MLC, the accuracy of memory cell programming for analog and MLC operation can be particularly important.

BRIEF SUMMARY OF THE INVENTION

The aforementioned problems and needs are addressed by a method of programming memory cells that includes reading the memory cells to determine respective read currents for the memory cells; assigning respective ones of the memory cells to one of a plurality of groups of the memory cells, wherein respective ones of the plurality of groups of the memory cells are associated with a different range of read currents, such that the determined read current for a respective one of the memory cells is within the range of read currents for the group of the memory cells to which the memory cell is assigned; and programming the memory cells using program currents that vary for respective ones of the memory cells depending upon the group of the memory cells to which the memory cell is assigned.

A method of programming memory cells includes reading the memory cells to determine respective first read currents for the memory cells; pre-programming the memory cells after the reading of the memory cells; reading the memory cells after the pre-programming of the memory cells to determine respective second read currents for the memory cells; assigning respective ones of the memory cells to one of a plurality of groups of the memory cells, wherein respective ones of the plurality of groups of the memory cells are associated with a different range of read current differentials, such that a read current differential between the first and second read currents and for a respective one of the memory cells is within the range of read current differentials for the group of the memory cells to which the memory cell is assigned; and programming the memory cells using program currents that vary for respective ones of the memory cells depending upon the group of the memory cells to which the memory cell is assigned.

A method of programming memory cells includes programming memory cells; reading the memory cells to determine respective read currents for the memory cells relative to a target read current and a reference read current, wherein the reference read current is greater than the target read current; programming those of the memory cells having a read current greater than a reference read current using a first program current; programming those of the memory cells having a read current less than the reference read current and greater than the target read current using a second program current that is less than the first program current; and ceasing programming those of the memory cells having a read current less than the target read current.

A memory device includes memory cells and a control circuitry. The control circuitry to read the memory cells to determine respective read currents for the memory cells; assign respective ones of the memory cells to one of a plurality of groups of the memory cells, wherein respective ones of the plurality of groups of the memory cells are associated with a different range of read currents, such that the determined read current for a respective one of the memory cells is within the range of read currents for the group of the memory cells to which the memory cell is assigned; and program the memory cells using program currents that vary for respective ones of the memory cells depending upon the group of the memory cells to which the memory cell is assigned.

A memory device includes memory cells and a control circuitry. The control circuitry to read the memory cells to determine respective first read currents for the memory cells; pre-program the memory cells after the read of the memory cells; read the memory cells after the pre-program of the memory cells to determine respective second read currents for the memory cells; assign respective ones of the memory cells to one of a plurality of groups of the memory cells, wherein respective ones of the plurality of groups of the memory cells are associated with a different range of read current differentials, such that a read current differential between the first and second read currents and for a respective one of the memory cells is within the range of read current differentials for the group of the memory cells to which the memory cell is assigned; and program the memory cells using program currents that vary for respective ones of the memory cells depending upon the group of the memory cells to which the memory cell is assigned.

A memory device includes memory cells and control circuitry. The control circuitry to program the memory cells; read the memory cells to determine respective read currents for the memory cells relative to a target read current and a reference read current, wherein the reference read current is greater than the target read current; program those of the memory cells having a read current greater than a reference read current using a first program current; program those of the memory cells having a read current less than the reference read current and greater than the target read current using a second program current that is less than the first program current; and cease programming those of the memory cells having a read current less than the target read current.

Other objects and features of the present disclosure will become apparent by a review of the specification, claims and appended figures.

BRIEF DESCRIPTION OF THE DRAWINGS

FIG. 1 is a cross sectional view of a conventional pair of memory cells.

FIG. 2 is a schematic and layout diagram of a conventional memory cell array of the memory cells of FIG. 1.

DETAILED DESCRIPTION OF THE INVENTION

Figure 4:
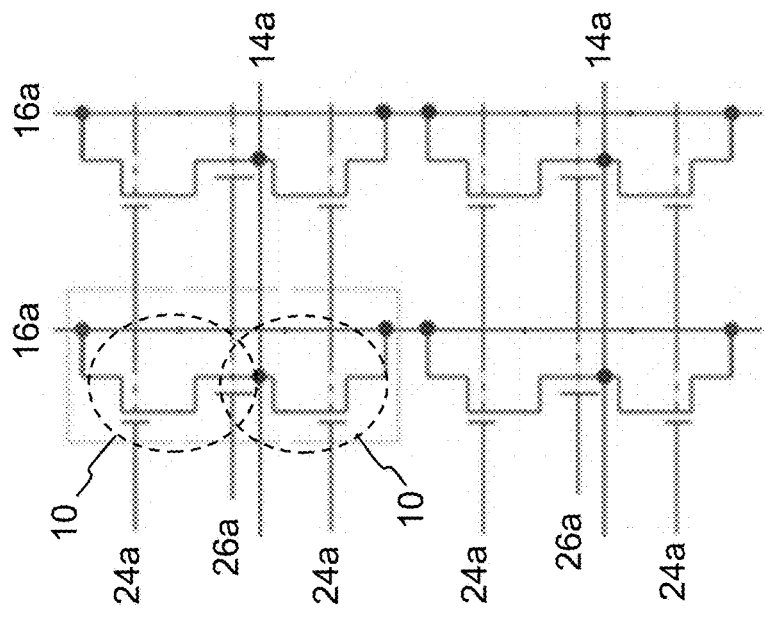
FIG. 4 is a schematic and layout diagram of a conventional memory cell array of the memory cells of FIG. 3.
Figure 3:
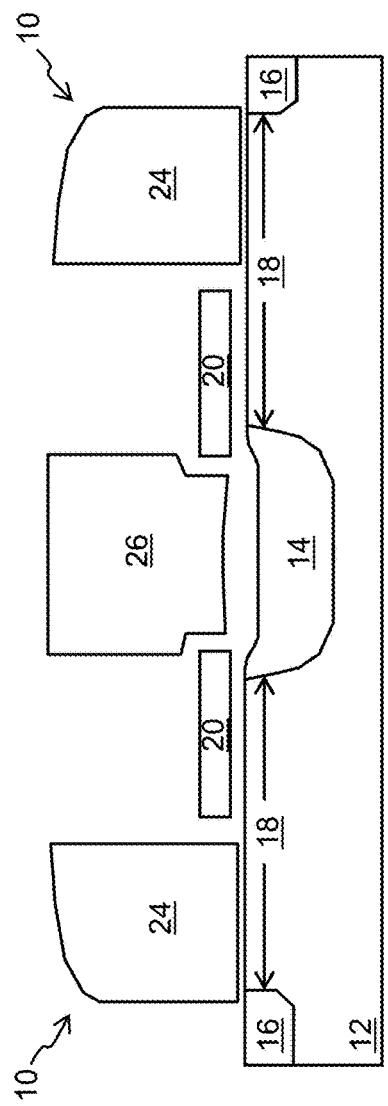
FIG. 3 is a side cross sectional view of a conventional pair of memory cells.
Figure 6:
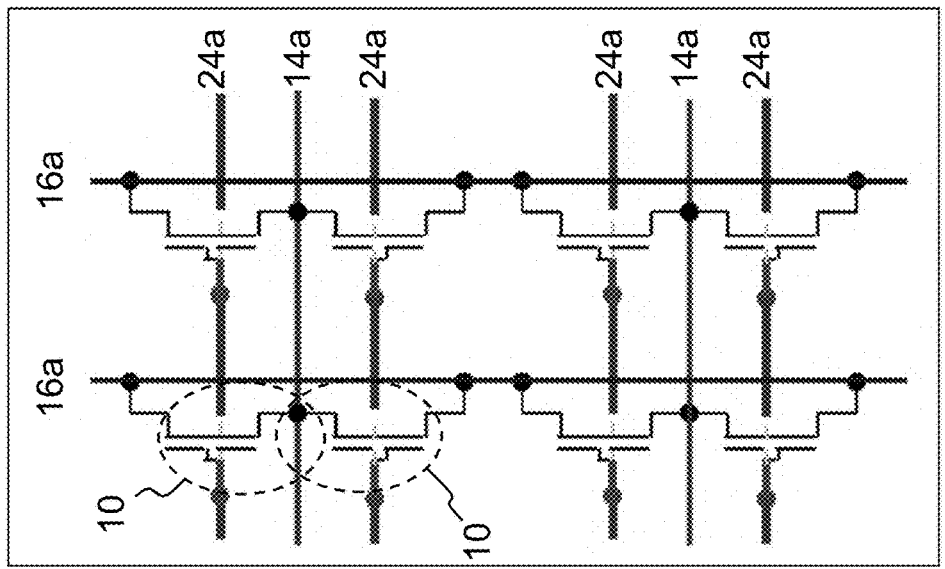
FIG. 6 is a schematic and layout diagram of a conventional memory cell array of the memory cells of FIG. 5.
Figure 5:
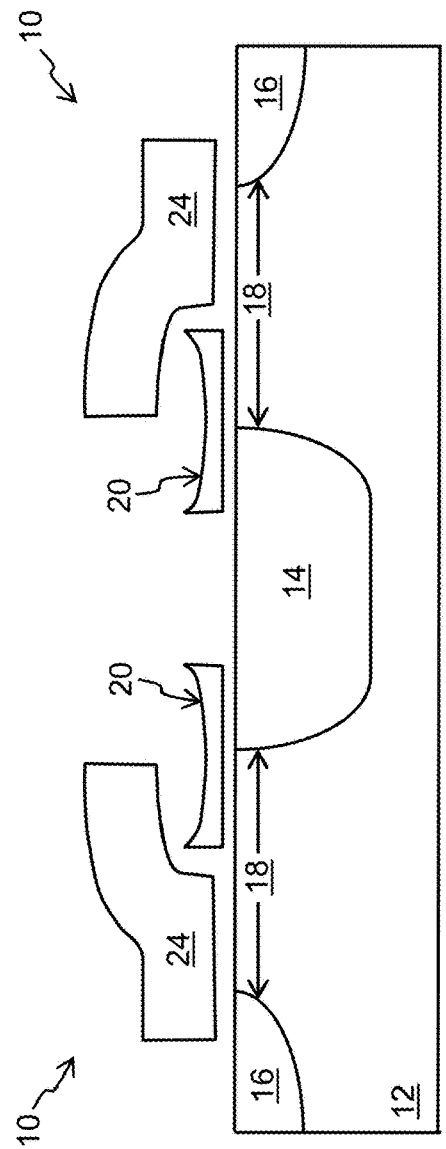
FIG. 5 is a side cross sectional view of a conventional pair of memory cells.
Figure 7:
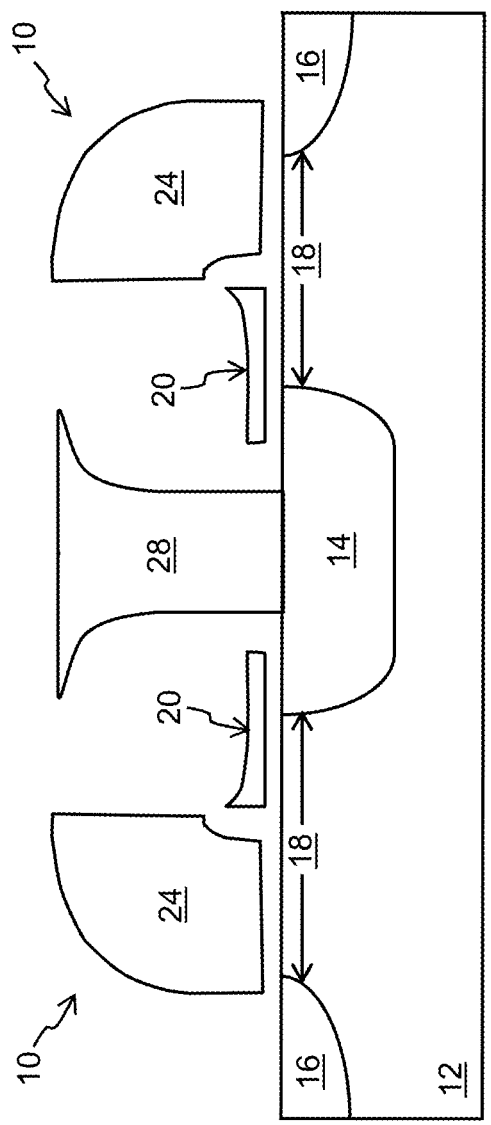
FIG. 7 is a side cross sectional view of a conventional pair of memory cells.
Figure 8:
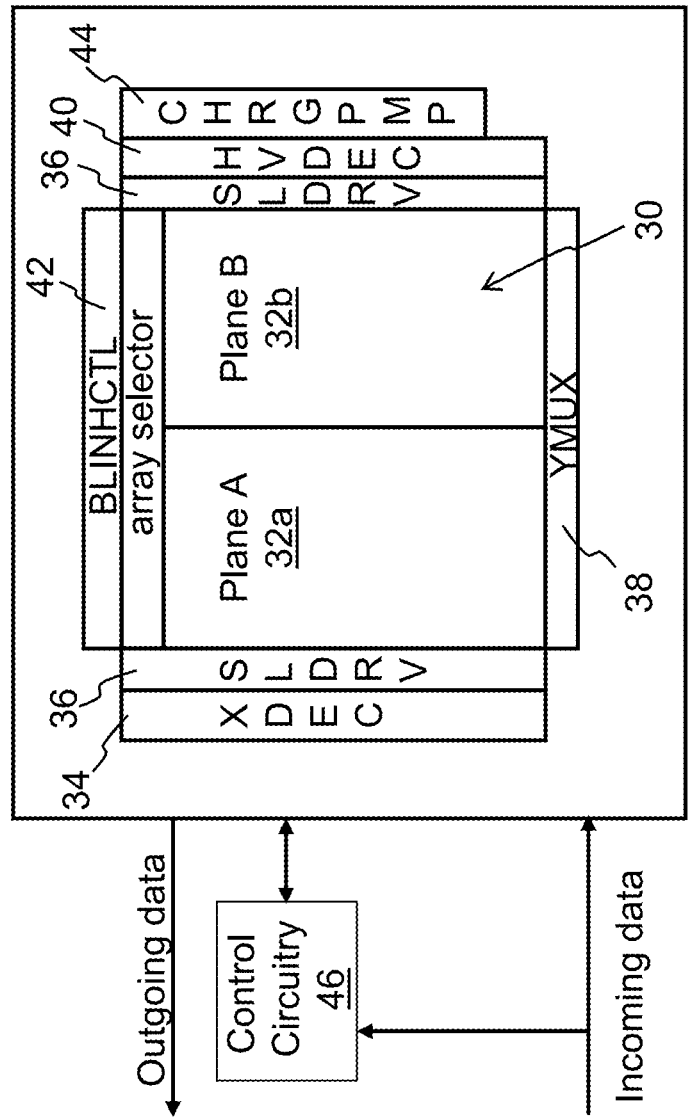
FIG. 8 is a diagram illustrating components of a memory device.

The present examples illustrate memory cell programing methods that includes memory cell program speed compensation for increasing program efficiency without unduly decreasing program accuracy. The programming methods can be implemented as part of control circuitry 46, which controls the various device elements for a memory array, which can be better understood from the architecture of an example memory device as illustrated in FIG. 8. The memory device includes an array 30 of the split gate memory cells 10, which can be segregated into two separate planes (Plane A 32a and Plane B 32b). The split gate memory cells 10 can be of the type shown in FIG. 1, 3, 5 or 7, arranged in a plurality of rows and columns in the semiconductor substrate 12 as illustrated in FIG. 2, 4 or 6, and thus formed on a single chip. Adjacent to the array of array 30 of split gate memory cells 10 are an address decoder 34 (e.g., XDEC), source line drivers 36 (e.g., SLDRV), a column decoder 38 (e.g., YMUX), a high voltage row decoder 40 (e.g., HVDEC) and a bit line controller 42 (e.g., BLINHCTL), which are used to decode addresses and supply the various voltages to the various gates and regions of the split gate memory cells 10 during read, program, and erase operations for selected split gate memory cells 10 of the array 30. Column decoder 38 includes a sense amplifier containing circuitry for measuring the currents on the bit lines during a read operation. Control circuitry 46 controls the various device elements to implement each operation (program, erase, read) on selected split gate memory cells 10 of the array 30 as described herein. Charge pump 44 (e.g., CHRGPMP) provides the various voltages used to read, program and erase the selected split gate memory cells 10 of the array 30 under the control of the control circuitry 46. Control circuitry 46 operates the memory device to program, erase and read the selected split gate memory cells 10 of the array 30. As part of these operations, the control circuitry 46 can be provided with access to incoming data which is data to be programmed to the selected split gate memory cells 10 of the array 30, along with program, erase and read commands provided on the same or different lines. Data read from the array 30 (i.e., from selected split gate memory cells 10 of the array 30) is provided as outgoing data.

The programming method involves the control circuitry 46 implementing memory cell programming. Thus, control circuitry 46 may be loaded with software, i.e. non-transitory electronically readable instructions, or firmware, or can consist of respective circuits, or any combination thereof, to perform the techniques described herein. Control circuitry 46 may be implemented by a microcontroller, dedicated circuitry, a processor, a general purpose processor running firmware or software, or a combination thereof.

In analog memory cell operation, programming can be performed by applying the programming voltages in discrete pulses, with intervening read operations to verify the programming state between programming pulses (i.e., sequential programming). Specifically, after each program pulse, a program verify read operation is performed to determine if the selected cells have reached their respective target program state (i.e., reached their target read current Irtarget associated with the target program state). If the determination is yes for any given memory cell, then a program inhibit voltage can be applied for that given memory cell so that subsequent program pulses for the other cells do not further program the given memory cell. For example, once a memory cell is determined to have achieved its desired program state, a program inhibit voltage can be applied to the corresponding bit line to prevent further programming of that memory cell. Memory cells determined to have not reached their desired program states are programmed with additional program pulses (also referred to as a program retry pulse train), often with a step-up in program voltage (e.g., for the memory cell of FIG. 1, the program voltage(s) placed on the control gate 22, select gate 24, erase gate 26, source region 14 or a combination thereof can be stepped higher and higher, program pulse to program pulse). The program retry pulse train continues until all the memory cells to be programmed have reached their target program states.

Figure 9:
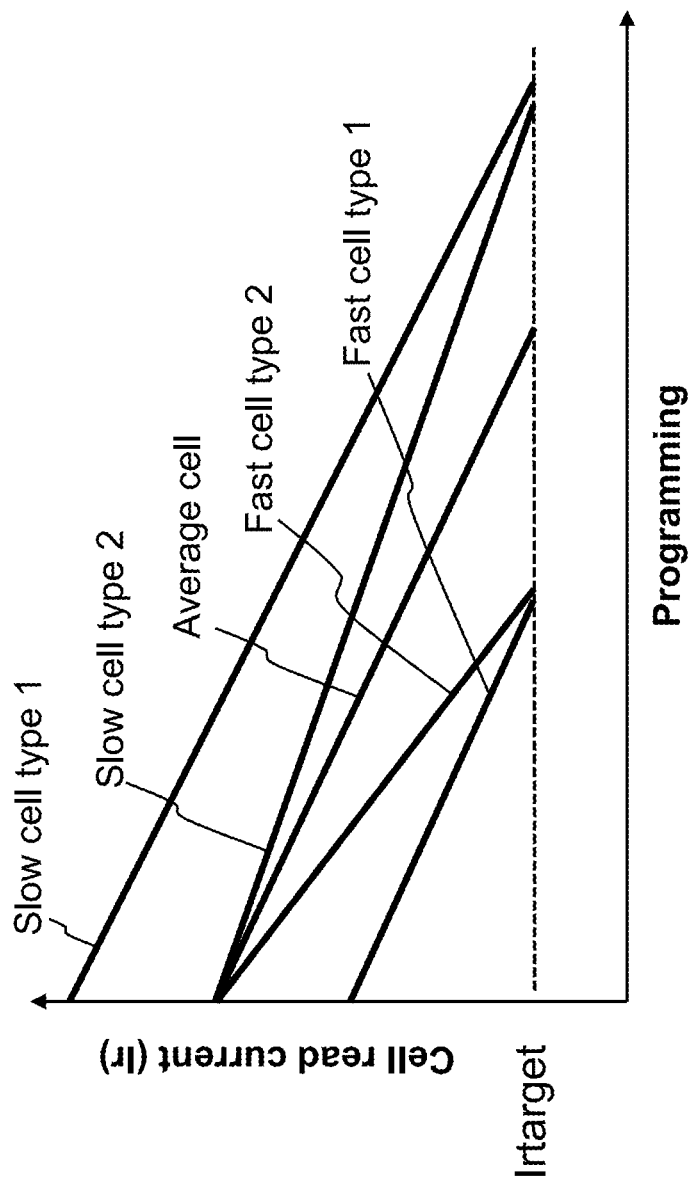
FIG. 9 is a plot of read current Ir vs. programming for various memory cells.

It has been determined that manufacturing process variations can cause cell-to-cell variations in program efficiency, meaning that some memory cells are programmed faster (i.e., to higher program states) than other memory cells given the same application of program voltage pulses. Cell-to-cell differences may appear as an offset (type 1) where the starting program state differs, or differing slope (type 2) where the amount of incremental increase in programming state in response to the same programming voltages varies, or both, as illustrated in the plot of read current Ir vs. programming in FIG. 9. To ensure all memory cells reach their respective target program states with high precision, the program retry pulse train can be quite long when balancing several factors. For example, the amplitudes of the first program pulse voltages should be low enough so that the fastest memory cells do not over-shoot their intended program states after the first program pulse. The last program pulse voltages should be high enough so that the slowest memory cells do not under-shoot their intended program states after the last pulse and do not take too long to program. The step size of pulse-to-pulse voltage increases of the program pulse train should be small enough so that all memory cells do not overshoot their intended program states by an excessive amount when they reach target program states. There is a trade-off between program precision and throughput, as the larger the program voltage step size, the fewer program pulses are needed, but the lower the program precision. Conversely, the smaller the program voltage step size, the more program pulses are needed, but with higher precision.

A programming method according to a first example identifies fast and slow programming memory cells, ideally to address cell-to-cell differences appearing as the offset (type 1) discussed above, where higher bit line program currents are applied to the slower memory cells during programming, and lower bit line program currents are applied to faster memory cells, to achieve a more uniform program speed for all the memory cells, thus tightening program cell current distribution. In this way, the total number of program pulses can be reduced to save power and program time, but without sacrificing program accuracy and precision.

Figure 10:
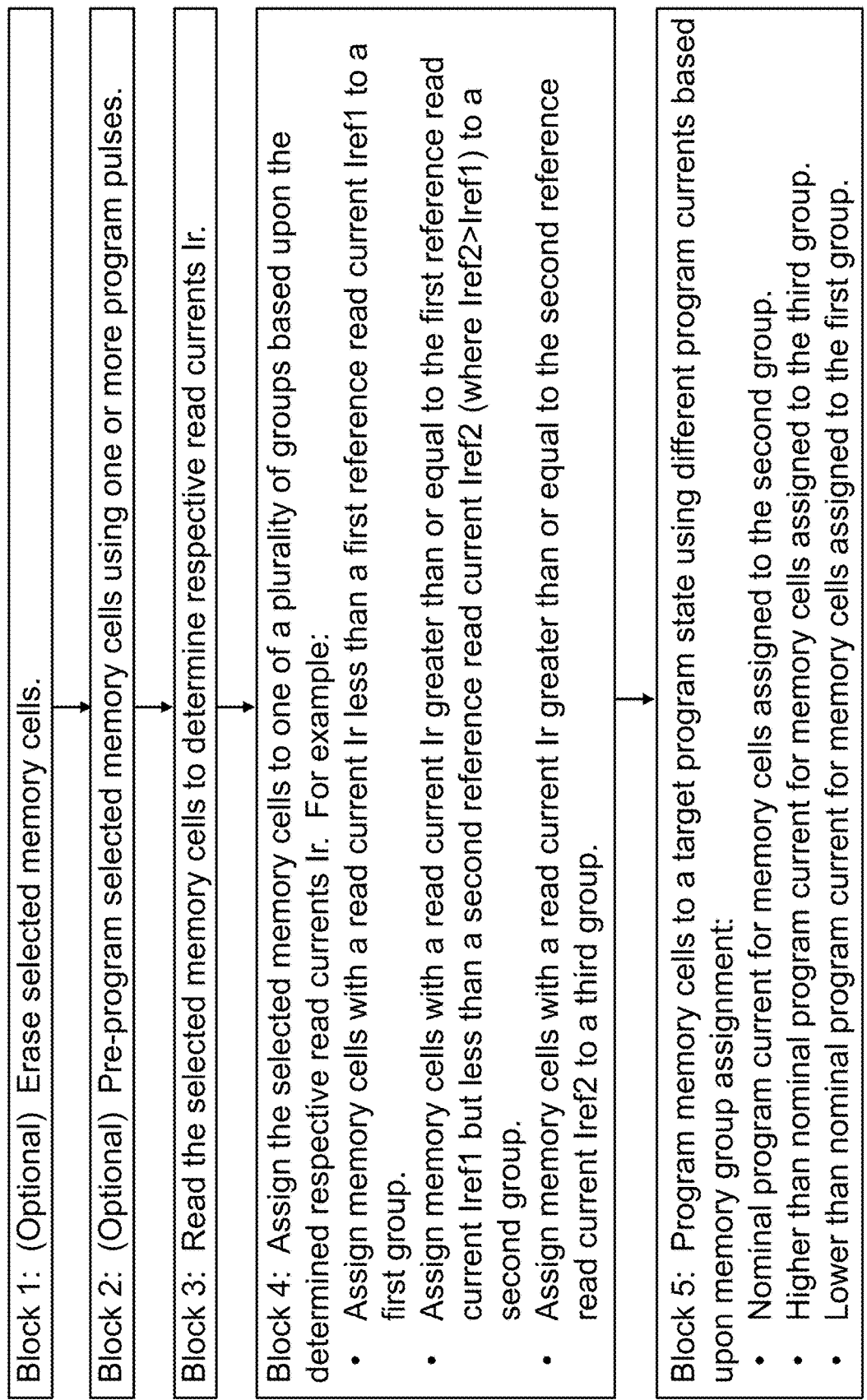
FIG. 10 is a flow diagram illustrating a programming method according to a first example.

As illustrated in FIG. 10, in Block 1, selected memory cells (i.e., those memory cells selected to be programmed to a target program state that provides the target read current Irtarget during a read operation, which can be a subset of the memory cells in the memory cell array) can undergo an erase operation, which is optional. In Block 2, the selected memory cells can undergo pre-programming using one or more program pulses, which is also optional. As non-limiting examples, pre-programming can include a single pre-program pulse, or can include two pre-program pulses where the second program pulse has at least one higher program voltage relative to the first program pulse).

In Block 3, the selected memory cells are then read where their respective read currents Ir are determined. In Block 4, the respective memory cells are assigned to one of a plurality of groups of the memory cells based upon the respective determined read currents Ir, where each group is associated with a different range of read currents. As a non-limiting example, three groups can be used, where the first group is associated with read currents less than a first reference read current Iref1, the second group is associated with read currents greater than, or equal to, the first reference read current Iref1 but less than a second reference read current Iref2, and the third group is associated with read currents greater than, or equal to, the second reference read current Iref2. In this example, those memory cells with a read current Ir less than the first reference read current Iref1 are assigned to the first group. Those memory cells with a read current Ir greater than, or equal to, the first reference read current Iref1 but less than the second reference read current Iref2 are assigned to the second group. Those memory cells with a read current Ir greater than, or equal to, the second reference read current Iref2 are assigned to the third group.

In Block 5, after the selected memory cells are assigned to the appropriate groups, sequential programming to the target program state (e.g., during normal operation programming where the memory cells are programmed to the target program state to represent data) of the selected memory cells is performed where the program current (e.g. bit line current) is selected for each memory cell during programming depending upon which group the memory cell is assigned to. For example, during programming to the target program state, the nominal program current (e.g., 1 uA) can be provided to the memory cells (e.g., via their bit lines) assigned to the second group during their programming, along with the nominal programming voltages for the erase gate (e.g., 4.5 V), control gate (e.g., 6-11 V), select gate (e.g., 1 V), and source line (e.g., 4.5 V). A higher than nominal program current (e.g., 3 uA) can be provided to the memory cells assigned to the third group during their programming, along with the above examples of programming voltages for the other gates and source line. A lower than nominal program current (e.g., 0.3 uA) can be provided to the memory cells assigned to the first group during their programming, along with the above examples of programming voltages for the other gates and source line. Once the target program state is achieved (i.e., target read current is achieved) for any given memory cell, programming stops either by ceasing the program pulses to that memory cell or using a program inhibit voltage on the memory cell to prevent further programming from subsequent program pulses used to continue programming other memory cells.

Figure 11:
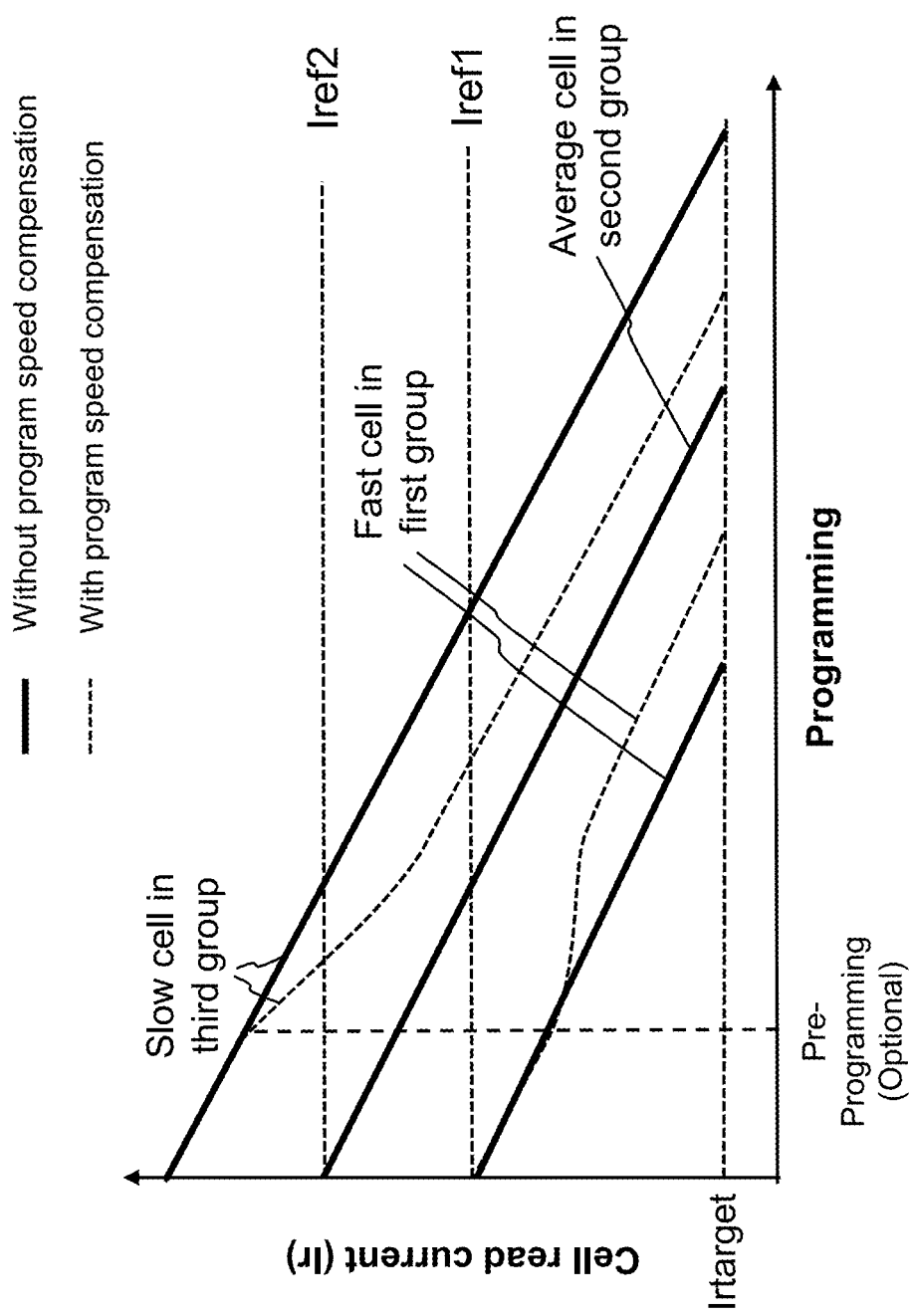
FIG. 11 is a plot of read current Ir vs. programming according to the first example.

FIG. 11 illustrates the effects of providing different program currents for the different groups of memory cells after the pre-programming pulses, where the program curves of slow and fast groups not implementing program speed compensation (indicated by solid lines) are shifted toward the average cells by implementing program speed compensation, as described in FIG. 10, (indicated by dashed lines), so that the fast memory cells reach their target program state less quickly (for higher program accuracy) and the slow memory cells reach their target program states more quickly (for higher program efficiency). This technique can reduce the number of program pulses without sacrificing precision. FIG. 11 further illustrates the grouping of the memory cells based on the cell read current Ir after the optional pre-programming, illustrating the slow cell assigned to the third group which have current after the optional pre-programming greater than, or equal to, Iref2; average memory cells assigned to the second group with a read current Ir greater than, or equal to, the first reference read current Iref1 but less than the second reference read current Iref2; and fast cells assigned to first group which have current after the optional pre-programming less than Iref1.

The above example has been described with the "equal to" condition resolved towards the slower cells, however this is not meant to be limiting in any way. In other examples the "equal to" condition can be resolved towards the faster cells (e.g., memory cells with a read current less than or equal to the first reference read current can be assigned to the first group, memory cells with a read current greater than the first reference read current but less than or equal to the second reference read current can be assigned to the second group, and memory cells with a read current greater than the second reference read current can be assigned to the third group), or can be resolved towards the average cells (e.g., memory cells with a read current less than the first reference read current can be assigned to the first group, memory cells with a read current greater than or equal to the first reference read current but less than or equal to the second reference read current can be assigned to the second group, and memory cells with a read current greater than the second reference read current can be assigned to the third group), or any possible combination, without limitation.

While the above example utilizes two reference read currents to place the selected cells in one of three groups (where different program currents are used to program the memory cells in the three groups), a single reference read current can be used to place the selected cells in one of two groups, or more than two reference currents can be used to place the selected cells in one of four or more groups, where different program currents are used to program the memory cells in the various groups (i.e., the higher the read current for the group, the higher the program current used to program the memory cells in that group in Block 5).

Figure 12:
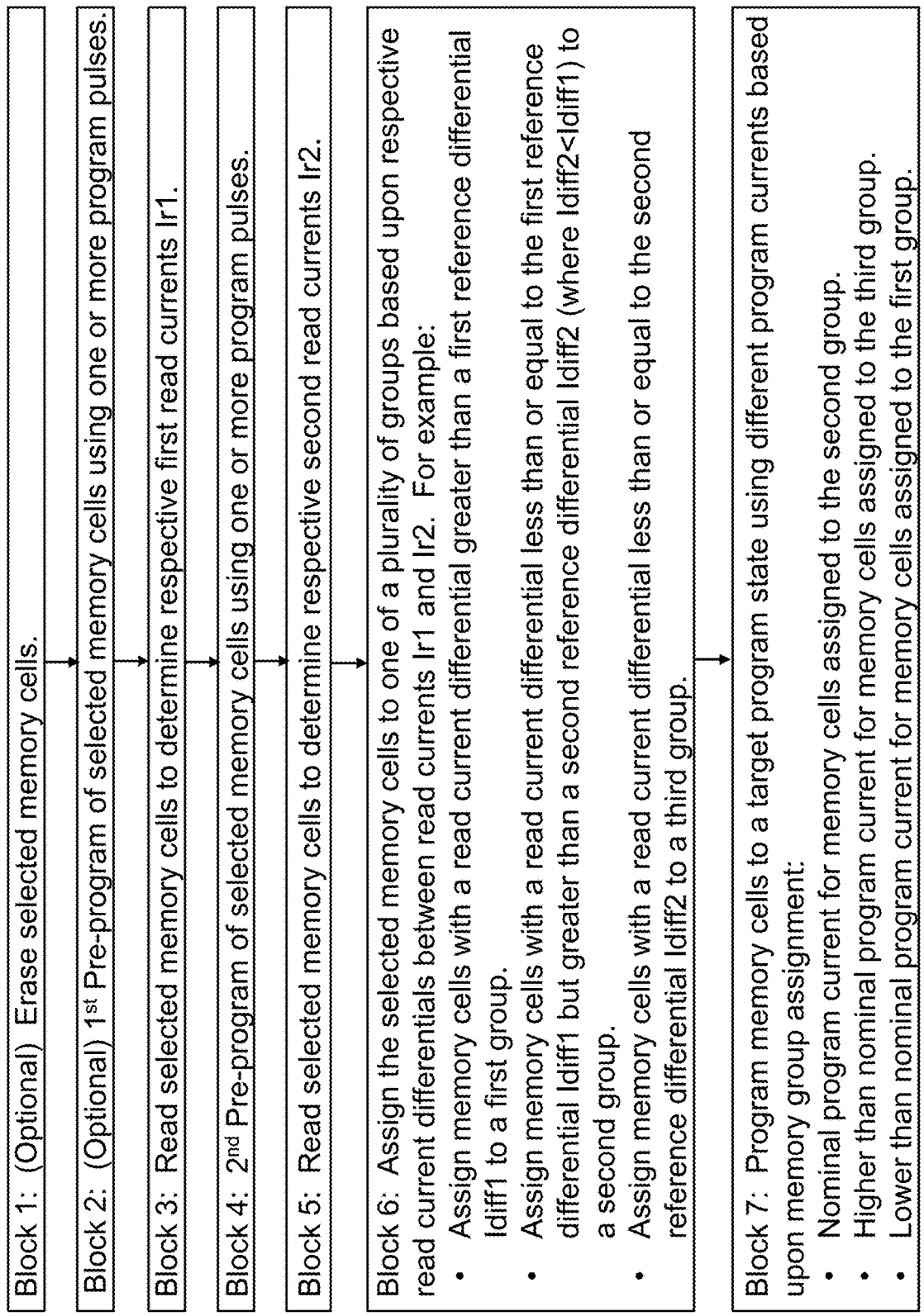
FIG. 12 is a flow diagram illustrating a programming method according to a second example.
Figure 13:
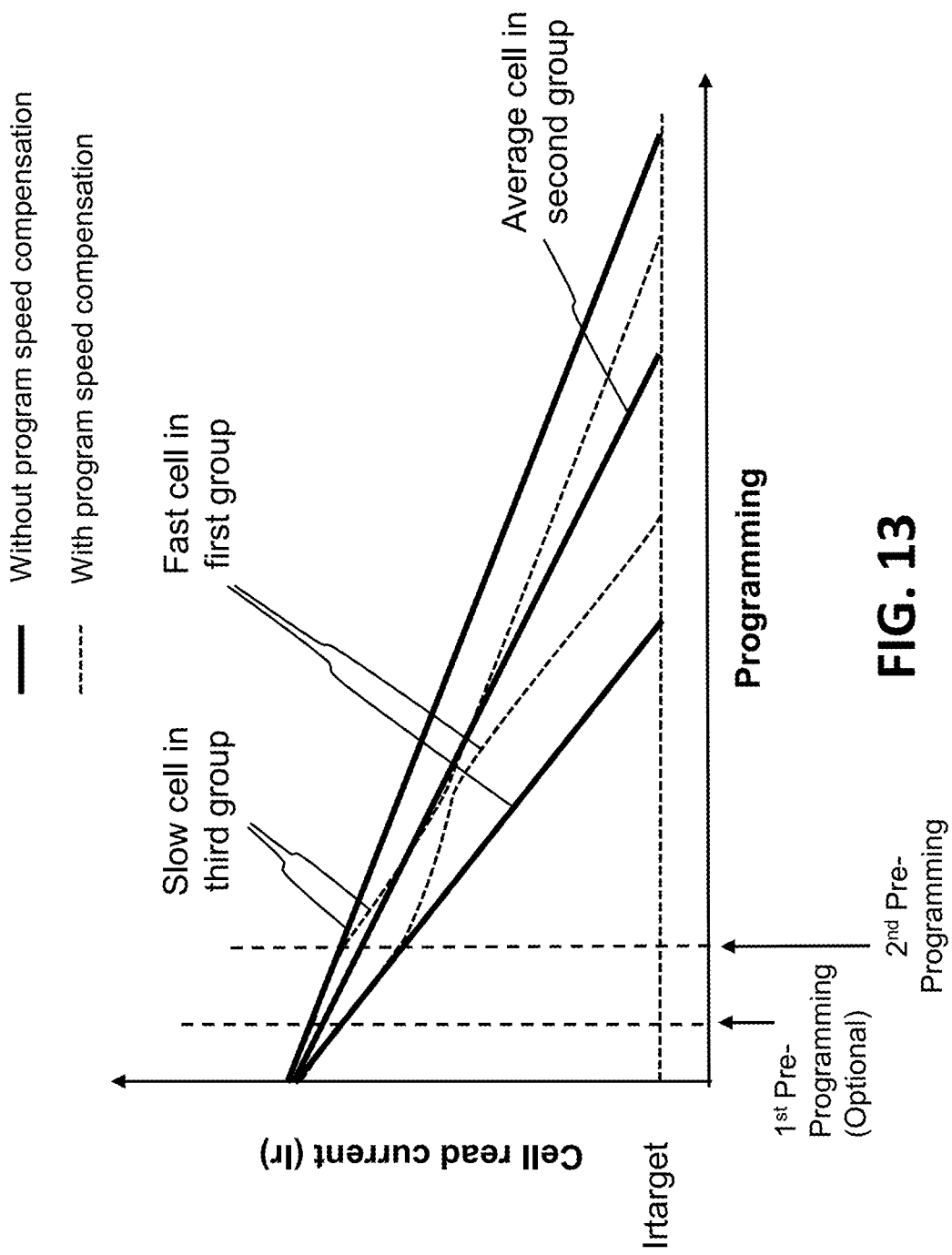
FIG. 13 is a plot of read current Ir vs. programming according to the second example.

A programming method according to a second example is illustrated in FIGS. 12-13, which is ideal in addressing cell-to-cell differences appearing as the differing slope (type 2) discussed above, where the amount of incremental increase in programming state in response to the same programming voltages varies cell to cell. In Block 1, the selected memory cells (i.e., those memory cells selected to be programmed to a target program state that provides the target read current Irtarget during a read operation, which can be a subset of the memory cells in the memory cell array) can undergo an erase operation, which is optional. In Block 2, the selected memory cells can undergo a first pre-program operation using one or more program pulses, which is also optional. As non-limiting examples, pre-programming can include a single program pulse, or can include two program pulses where the second program pulse has at least one higher program voltage relative to the first program pulse. In Block 3, the selected memory cells are read to determine respective first read currents Ir1. In Block 4, the selected memory cells undergo a second pre-program operation that can include one or more program pulses. In Block 5, the selected memory cells are read to determine respective second read currents Ir2. In the event that Block 2 is not performed, Block 4 will be a first pre-program operation that can include one or more program pulses.

In Block 6, the respective memory cells are assigned to one of a plurality of groups of the memory cells based upon the respective read current differential between the first read current Ir1 and the second read current Ir2, where each group is associated with a different range of read current differentials. As a non-limiting example, three groups can be used, where the first group (fast) is associated with read current differentials (i.e. differences between Ir1 and Ir2) that are greater than a first reference differential Idiff1, the second group is associated with read current differentials that are less than, or equal to, the first reference differential Idiff1 but greater than a second reference differential Idiff2, and the third group (slow) is associated with read current differentials that are less than, or equal to, the second reference differential Idiff2. In this example, those memory cells with respective read current differentials (respective difference between Ir1 and Ir2) greater than the first reference differential Idiff1 are assigned to the first group. Those memory cells with read current differentials less than, or equal to, the first reference differential Idiff1 but greater than the second reference differential Idiff1 are assigned to the second group. Those memory cells with read current differentials less than, or equal to, the second reference differential Idiff2 are assigned to the third group. The above example has been described with the "equal to" condition resolved towards the second and third groups, respectively, however this is not meant to be limiting in any way. In other examples the "equal to" condition can be resolved towards the slower cells, towards the faster cells, or towards the average cells, or any possible combination, without limitation.

In Block 7, after the selected memory cells are assigned to the appropriate groups, sequential programming to the target program state (e.g., during normal operation programming where the memory cells are programmed to the target program state to represent data) of the selected memory cells is performed where the program current (e.g. bit line current) is adjusted for each memory cell during programming depending upon which group the memory cell is assigned to. For example, during normal operation programming, the nominal program current (e.g., 1 uA) can be provided to the memory cells (e.g., via their bit lines) assigned to the second group during their programming, along with the nominal programming voltages for the erase gate (e.g., 4.5 V), control gate (e.g., 6-11 V), select gate (e.g., 1 V), and source line (e.g., 4.5 V). A higher than nominal program current (e.g., 3 uA) can be provided to the memory cells assigned to the third group during their programming, along with the above examples of programming voltages for the other gates and source line. A lower than nominal program current (e.g., 0.3 uA) can be provided to the memory cells assigned to the first group during their programming, along with the above examples of programming voltages for the other gates and source line. FIG. 13 further illustrates the grouping of the memory cells based on the cell read current Ir after the optional first pre-programming and the second pre-programming, illustrating the slow cells assigned to the third group which have a slope between the first and second pre-programming greater than Idiff1; average memory cells assigned to the second group which have a slope between the first and second pre-programming that are less than, or equal to, the first reference differential Idiff1 but greater than a second reference differential Idiff2; and fast cells assigned to the first group which have a slope between the first and second pre-programming less than, or equal to, the second reference differential Idiff2. Once the target program state is achieved (i.e., target read current is achieved) for any given memory cell, programming stops either by ceasing the program pulses to that memory cell or using a program inhibit voltage on the memory cell to prevent further programming from subsequent program pulses used to continue programming other memory cells.

FIG. 13 illustrates the effects of providing different program currents for the different groups of memory cells after the pre-programming, where the program curves of slow and fast groups not implementing program speed compensation (indicated by solid lines) are shifted toward the average cells by implementing program speed compensation (indicated by dashed lines), so that the fast memory cells reach their target program state less quickly (for higher program accuracy) and the slow memory cells reach their target program states more quickly (for higher program efficiency). This technique can reduce the number of program pulses without sacrificing precision.

While the above example utilizes two reference change values to place the selected cells in one of three groups (where different program currents are used to program the memory cells in the three groups), a single reference change value can be used to place the selected cells in one of two groups, or more than two reference change values can be used to place the selected cells in one of four or more groups, where different program currents are used to program the memory cells in the various groups (i.e., the higher the read current differential for the group, the lower the program current used to program the memory cells in that group in Block 7).

Figure 14:
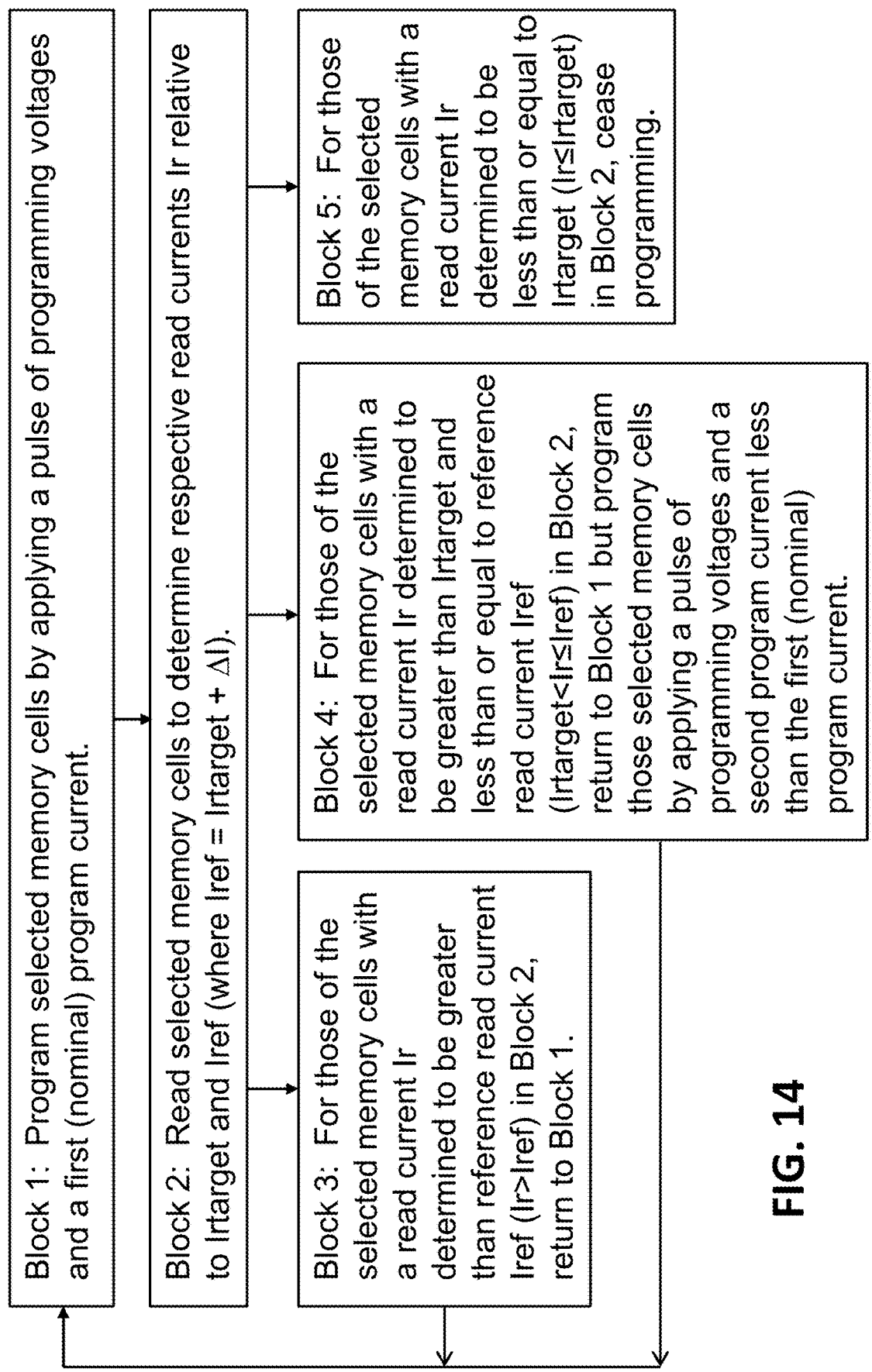
FIG. 14 is a flow diagram illustrating a programming technique according to a third example.
Figure 15:
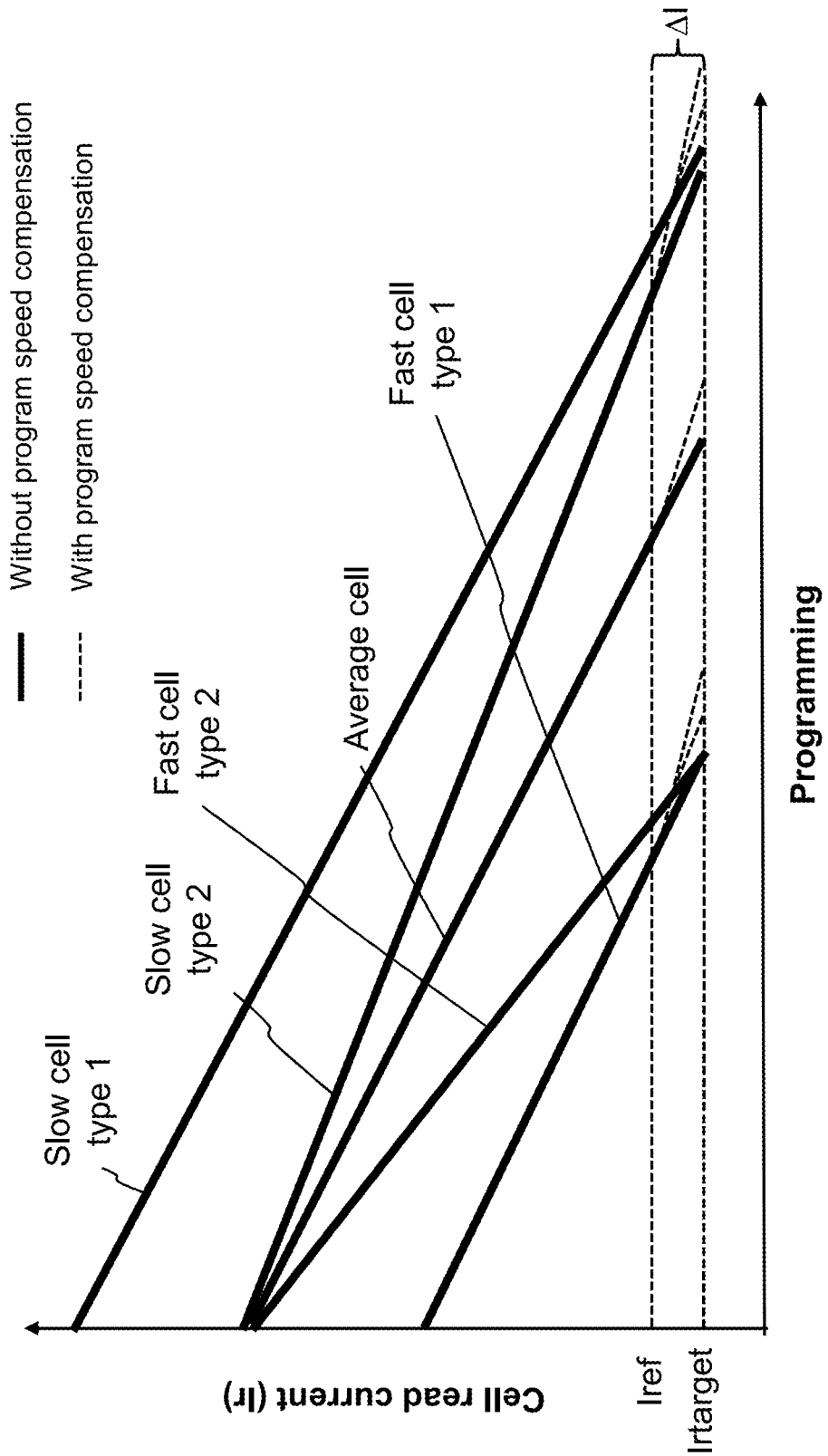
FIG. 15 is a plot of read current Ir vs. programming according to the third example.

A programming method according to a third example is illustrated in FIGS. 14-15, for programming selected memory cells to a program state corresponding to a target read current Irtarget. In Block 1, the selected memory cells are programmed by applying a pulse of programming voltages and a first program current, which first program current may be considered a nominal program current. In Block 2, a read operation is performed, where the selected memory cells are read to determine their respective read currents Ir relative to the target read current Irtarget and a reference read current Iref that is greater than the target read current Irtarget (e.g., Iref=Irtarget+ΔI). In Block 3, for those selected memory cells with a read current Ir greater than the reference read current Iref (i.e., Ir>Iref), programming continues by returning to Block 1. In Block 4, for those selected memory cells with a read current Ir greater than Irtarget and less than or equal to reference read current Iref (i.e., Irtarget<Ir≤Iref), programming continues by returning to Block 1 but program those selected memory cells by applying a pulse of programming voltages and a second program current, which second program current is less than the first program current. In Block 5, for those selected memory cells with a read current Ir less than or equal to Irtarget (i.e., Ir≤Irtarget), programming is ceased (i.e., either by ceasing any further program pulses applied to those selected memory cells or using a program inhibit voltage on those selected memory cells to prevent further programming from subsequent program pulses used to continue programming other memory cells). This programming method reduces the speed of programming (i.e. reduces the decrease in read current Ir caused by each subsequent program pulse, as the selected memory cells approach the respective target read current Irtarget (i.e., fall within the range of read currents between Iref and Irtarget), and in turn increases the precision of the final programmed level. This technique improves the precision of programming without sacrificing program throughput.

The above example has been described with the "equal to" condition resolved towards the lower read currents, however this is not meant to be limiting in any way. In other examples the "equal to" condition can be resolved towards the higher read currents, towards the range of Irtarget-Iref, or any possible combination, without limitation.

FIG. 15 illustrates the effects of providing different program currents for the different memory cells, where the slope of the tail ends of the program curves not implementing program speed compensation (indicated by solid lines) are reduced by implementing program speed compensation (indicated by dashed lines) as described in relation to FIG. 14, so that the speed of programming is reduced for those memory cells within ΔI of the target read current Irtarget (for better precision) while the speed of programming is not reduced for those memory cells not within ΔI of the target read current Irtarget (for better speed). This technique can reduce the number of program pulses without unduly sacrificing precision.

While the above example utilizes a single reference read current to slow the rate of programing for memory cells within ΔI of the target read current Irtarget, more than one reference current can be used to gradually step down the rate of programming as memory cells approach Irtarget (i.e., the closer the read current is to Irtarget, the lower the program current used for programming).

Figure 16:
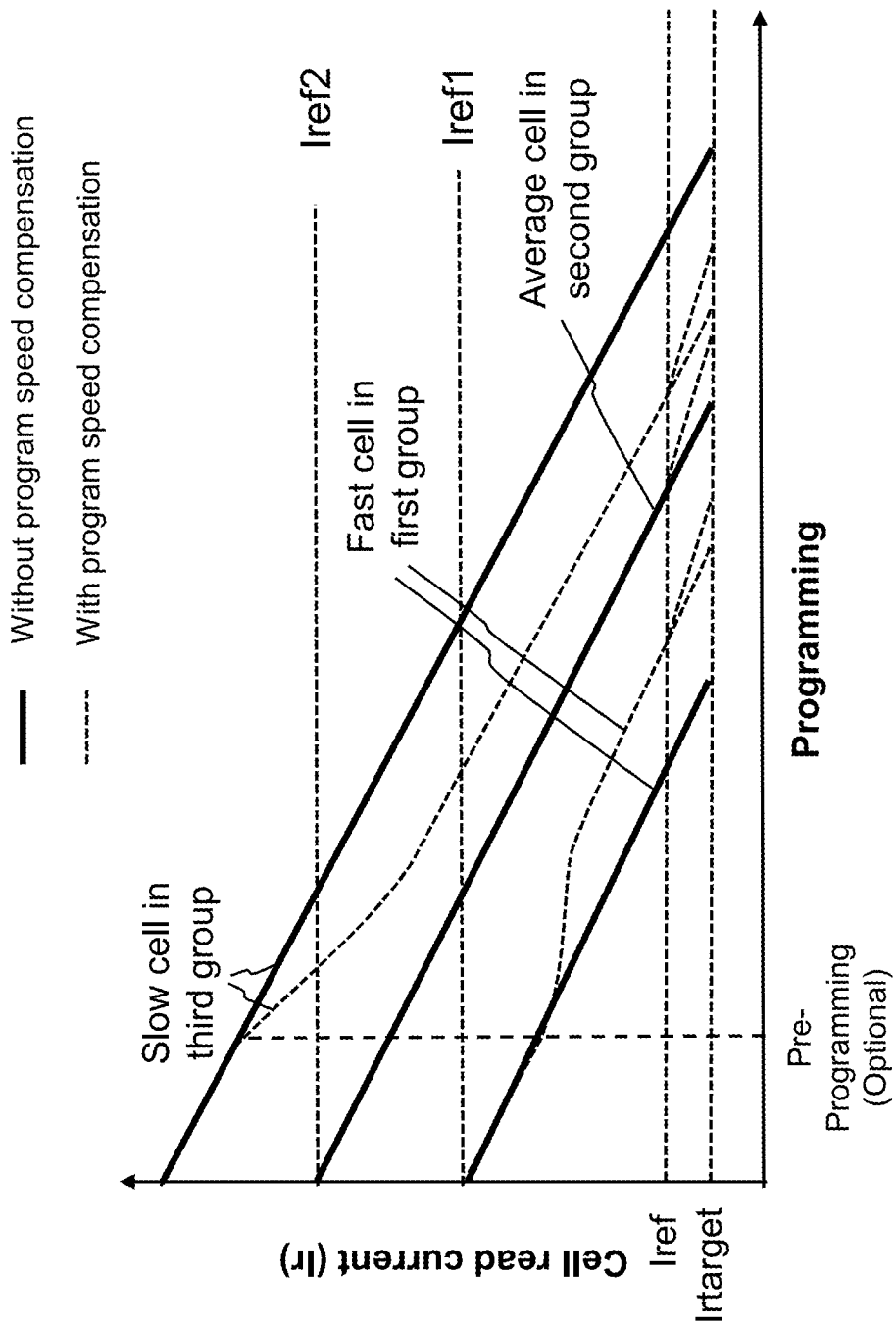
FIG. 16 is a plot of read current Ir vs. programming according to a combination of the first and third examples.

In yet another example, the third example of FIGS. 14-15 can be combined with the first example of FIGS. 10-11. Specifically, Blocks 1-5 of FIG. 10 can be performed, but in Block 5 of FIG. 10, as the programming states of the memory cells get close to but do not reach the target programming state, then Blocks 1-5 of FIG. 14 are performed to complete programming. FIG. 16 illustrates the effects of this example.

Figure 17:
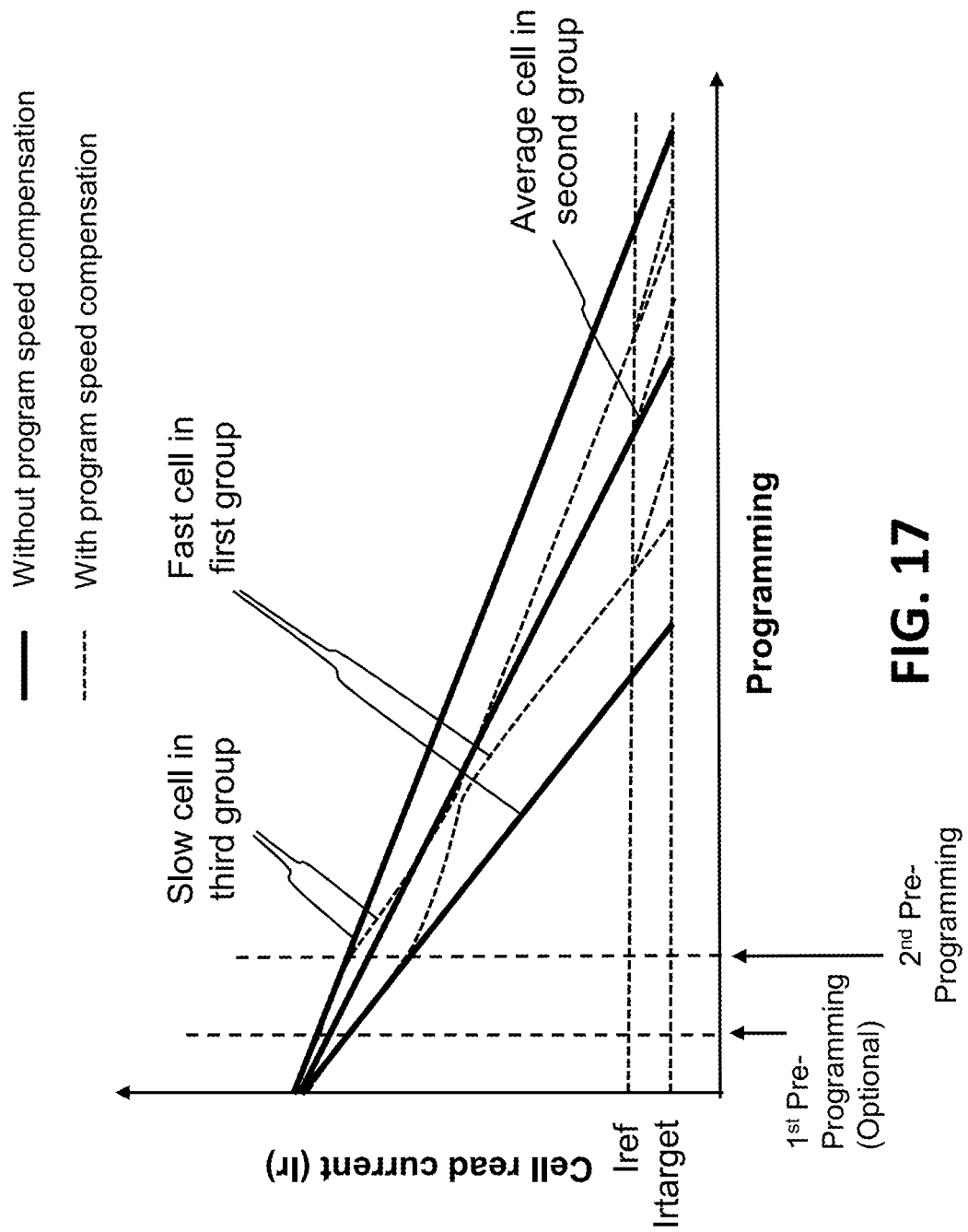
FIG. 17 is a plot of read current Ir vs. programming according to a combination of the second and third examples.

In yet one more example, the third example of FIGS. 14-15 can be combined with the second example of FIGS. 12-13. Specifically, Blocks 1-7 of FIG. 12 can be performed, but in Block 7 of FIG. 12, as the programming states of the memory cells get close to but do not reach the target programming state, then Blocks 1-5 of FIG. 14 are performed to complete programming. FIG. 17 illustrates the effects of this example.

It is to be understood that the present disclosure is not limited to the example(s) described above and illustrated herein, but encompasses any and all variations falling within the scope of any claims. For example, references to the present disclosure or invention or examples herein are not intended to limit the scope of any claim or claim term, but instead merely make reference to one or more features that may be covered by one or more claims. While the examples are described with respect to the four gate memory cell of FIG. 1, the above described techniques can be equally applied using any of the memory cell configurations of FIGS. 1, 3, 5, and 7. Materials, processes and numerical examples described above are exemplary only, and should not be deemed to limit any claims.

What is claimed is:

1. A method of programming memory cells, comprising:
   reading the memory cells to determine respective read currents for the memory cells;
   assigning respective ones of the memory cells to one of a plurality of groups of the memory cells, wherein respective ones of the plurality of groups of the memory cells are associated with a different range of read currents, such that the determined read current for a respective one of the memory cells is within the range of read currents for the group of the memory cells to which the memory cell is assigned; and
   programming the memory cells using program currents that vary for respective ones of the memory cells depending upon the group of the memory cells to which the memory cell is assigned.

2. The method of claim 1, comprising:
   erasing the memory cells before the reading of the memory cells.

3. The method of claim 1, comprising:
   pre-programming the memory cells before the reading of the memory cells.

4. The method of claim 1, wherein:
   the plurality of groups of the memory cells comprises at least a first group, a second group and a third group;
   the first group is associated with a range of read currents less than a first reference read current;
   the second group is associated with a range of read currents greater than the first reference read current and less than a second reference read current;
   the third group is associated with a range of read currents greater than the second reference read current;
   the programming of the memory cells assigned to the first group comprising using a first program current;
   the programming of the memory cells assigned to the second group comprising using a second program current;
   the programming of the memory cells assigned to the third group comprising using a third program current;
   the first program current is less than the second program current; and
   the second program current is less than the third program current.

5. The method of claim 1, wherein after the programming, the method comprising:
   reading the memory cells to determine respective second read currents for the memory cells;
   programming those of the memory cells having a second read current greater than a reference read current using a first program current; and
   programming those of the memory cells having a second read current less than the reference read current using a second program current that is less than the first program current.

6. A method of programming memory cells, comprising:
   reading the memory cells to determine respective first read currents for the memory cells;
   pre-programming the memory cells after the reading of the memory cells;
   reading the memory cells after the pre-programming of the memory cells to determine respective second read currents for the memory cells;
   assigning respective ones of the memory cells to one of a plurality of groups of the memory cells, wherein respective ones of the plurality of groups of the memory cells are associated with a different range of read current differentials, such that a read current differential between the first and second read currents and for a respective one of the memory cells is within the range of read current differentials for the group of the memory cells to which the memory cell is assigned; and
   programming the memory cells using program currents that vary for respective ones of the memory cells depending upon the group of the memory cells to which the memory cell is assigned.

7. The method of claim 6, comprising:
   erasing the memory cells before the reading of the memory cells.

8. The method of claim 6, comprising:
   pre-programming the memory cells before the reading of the memory cells.

9. The method of claim 6, wherein:
   the plurality of groups of the memory cells comprises at least a first group, a second group and a third group;
   the first group is associated with a range of read current differentials greater than a first reference differential;
   the second group is associated with a range of read current differentials greater than the first reference differential and less than a second reference differential;
   the third group is associated with a range of read current differentials greater than the second reference differential;
   the programming of the memory cells assigned to the first group comprising using a first program current;
   the programming of the memory cells assigned to the second group comprising using a second program current;
   the programming of the memory cells assigned to the third group comprising using a third program current;
   the first program current is less than the second program current; and
   the second program current is less than the third program current.

10. The method of claim 6, wherein after the programming, the method comprising:
    reading the memory cells to determine respective second read currents for the memory cells;
    programming those of the memory cells having a second read current greater than a reference read current using a first program current; and
    programming those of the memory cells having a second read current less than the reference read current using a second program current that is less than the first program current.

11. A method of programming memory cells, comprising:
    programming memory cells;
    reading the memory cells to determine respective read currents for the memory cells relative to a target read current and a reference read current, wherein the reference read current is greater than the target read current;
    programming those of the memory cells having a read current greater than a reference read current using a first program current;
    programming those of the memory cells having a read current less than the reference read current and greater than the target read current using a second program current that is less than the first program current; and
    ceasing programming those of the memory cells having a read current less than the target read current.

12. A memory device, comprising:
memory cells; and
a control circuitry to:
  read the memory cells to determine respective read currents for the memory cells;
  assign respective ones of the memory cells to one of a plurality of groups of the memory cells, wherein respective ones of the plurality of groups of the memory cells are associated with a different range of read currents, such that the determined read current for a respective one of the memory cells is within the range of read currents for the group of the memory cells to which the memory cell is assigned; and
  program the memory cells using program currents that vary for respective ones of the memory cells depending upon the group of the memory cells to which the memory cell is assigned.

13. The memory device of claim 12, wherein the control circuitry to:
  erase the memory cells before the read of the memory cells.

14. The memory device of claim 12, wherein the control circuitry to:
  pre-program the memory cells before the read of the memory cells.

15. The memory device of claim 12, wherein:
the plurality of groups of the memory cells comprises at least a first group, a second group and a third group;
the first group is associated with a range of read currents less than a first reference read current;
the second group is associated with a range of read currents greater than the first reference read current and less than a second reference read current;
the third group is associated with a range of read currents greater than the second reference read current;
the program of the memory cells assigned to the first group comprises using a first program current;
the program of the memory cells assigned to the second group comprises using a second program current;
the program of the memory cells assigned to the third group comprises using a third program current;
the first program current is less than the second program current; and
the second program current is less than the third program current.

16. The memory device of claim 12, wherein after the program of the memory cells, the control circuitry to:
  read the memory cells to determine respective second read currents for the memory cells;
  program those of the memory cells having a second read current greater than a reference read current using a first program current; and
  program those of the memory cells having a second read current less than the reference read current using a second program current that is less than the first program current.

17. A memory device, comprising:
memory cells; and
a control circuitry to:
  read the memory cells to determine respective first read currents for the memory cells;
  pre-program the memory cells after the read of the memory cells;
  read the memory cells after the pre-program of the memory cells to determine respective second read currents for the memory cells;
  assign respective ones of the memory cells to one of a plurality of groups of the memory cells, wherein respective ones of the plurality of groups of the memory cells are associated with a different range of read current differentials, such that a read current differential between the first and second read currents and for a respective one of the memory cells is within the range of read current differentials for the group of the memory cells to which the memory cell is assigned; and
  program the memory cells using program currents that vary for respective ones of the memory cells depending upon the group of the memory cells to which the memory cell is assigned.

18. The memory device of claim 17, wherein the control circuitry to:
  erase the memory cells before the read of the memory cells.

19. The memory device of claim 17, wherein the control circuitry to:
  pre-program the memory cells before the read of the memory cells.

20. The memory device of claim 17, wherein:
the plurality of groups of the memory cells comprises at least a first group, a second group and a third group;
the first group is associated with a range of read current differentials greater than a first reference differential;
the second group is associated with a range of read current differentials greater than the first reference differential and less than a second reference differential;
the third group is associated with a range of read current differentials greater than the second reference differential;
the program of the memory cells assigned to the first group comprises using a first program current;
the program of the memory cells assigned to the second group comprises using a second program current;
the program of the memory cells assigned to the third group comprises using a third program current;
the first program current is less than the second program current; and
the second program current is less than the third program current.

21. The memory device of claim 17, wherein after the program of the memory cells, the control circuitry to:
  read the memory cells to determine respective second read currents for the memory cells;
  program those of the memory cells having a second read current greater than a reference read current using a first program current; and
  program those of the memory cells having a second read current less than the reference read current using a second program current that is less than the first program current.

22. A memory device, comprising:
memory cells; and
a control circuitry to:
  program the memory cells;
  read the memory cells to determine respective read currents for the memory cells relative to a target read current and a reference read current, wherein the reference read current is greater than the target read current;
  program those of the memory cells having a read current greater than a reference read current using a first program current;

program those of the memory cells having a read current less than the reference read current and greater than the target read current using a second program current that is less than the first program current; and
cease programming those of the memory cells having a read current less than the target read current.

\* \* \* \* \*